United States Patent [19]

Cianciola

[11] Patent Number: 4,976,252
[45] Date of Patent: Dec. 11, 1990

[54] STOVE TOP GRILL

[76] Inventor: Vince Cianciola, 209 Saw Mill Run Rd., Canfield, Ohio 44406

[21] Appl. No.: 480,245

[22] Filed: Feb. 15, 1990

[51] Int. Cl.⁵ .......................... F24B 3/00; A47J 37/00
[52] U.S. Cl. .................................... 126/27; 126/41 R; 99/401; 99/425
[58] Field of Search ...................... 126/27, 41 R, 41 A, 126/41 B, 41 C, 41 D, 41 E, 41 F, 9 B, 337 R; 99/425, 444, 445, 446

[56] References Cited

U.S. PATENT DOCUMENTS

| 1,057,449 | 4/1913 | Noreck | 126/41 D |
| 2,352,613 | 7/1944 | Bradbury | 126/41 E |
| 2,477,721 | 8/1949 | Chesser et al. | 126/41 E |
| 3,469,524 | 9/1969 | Trozzolo | . |
| 4,694,816 | 9/1987 | Fabbro | . |
| 4,729,297 | 3/1988 | Iranzadi | . |

Primary Examiner—Larry Jones
Attorney, Agent, or Firm—Harpman & Harpman

[57] ABSTRACT

A stove top grill assembly having a contoured base defining an annular channel about an opening within the placement over a burner of a stove. A grill plate having a plurality of aligned parallel grooves therein each having oppositely disposed slots at their respective ends. The grill plate rest on the perimeter edge of the base in spaced relation to the opening and annular channel which is filled with water to catch the grease.

4 Claims, 1 Drawing Sheet

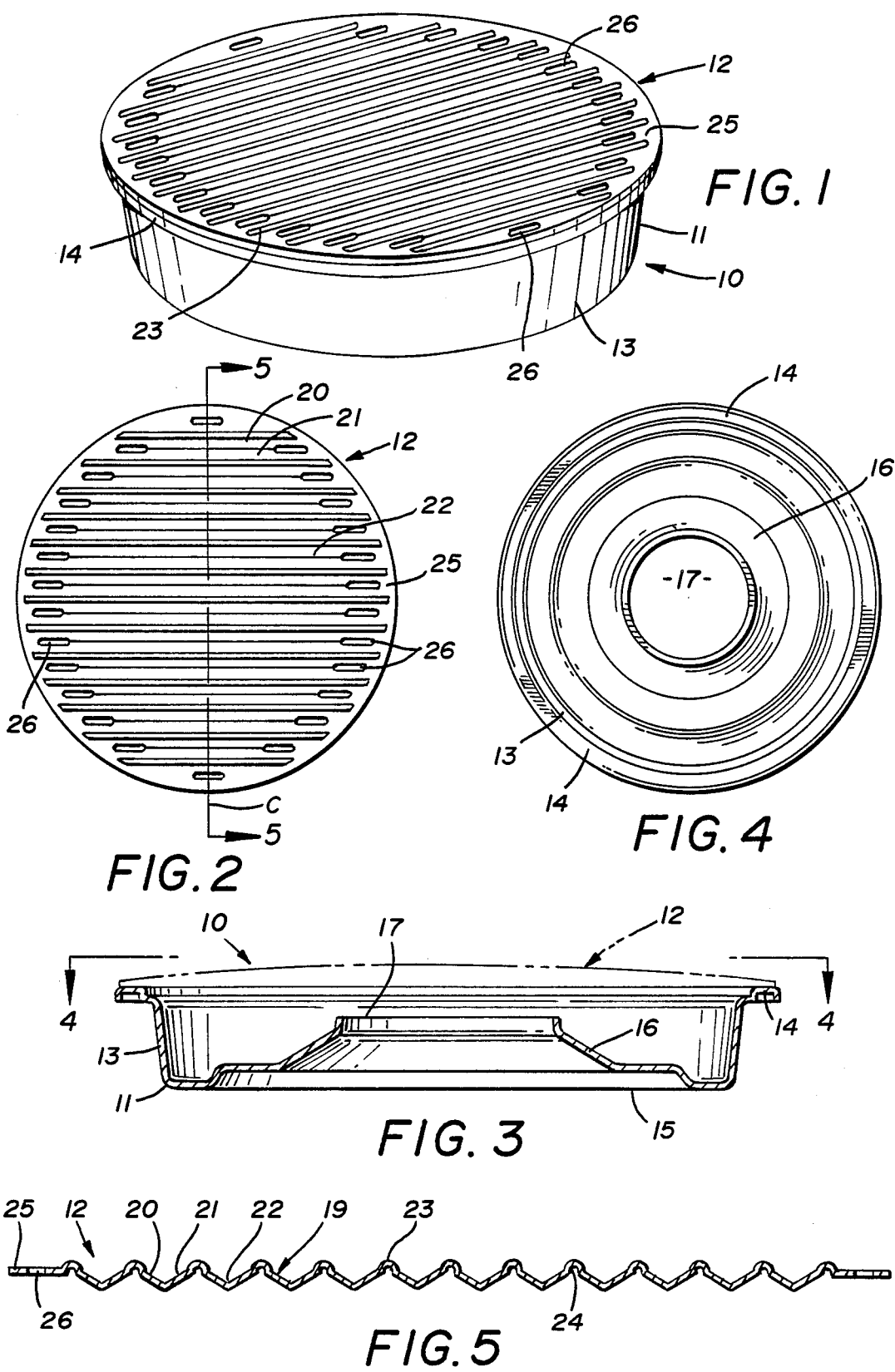

STOVE TOP GRILL

BACKGROUND OF THE INVENTION

1. Techincal Field

This device relates to cooking grills that are positioned on the surface of the stove or a burner to grill foods in a confined smokeless configuration.

2. Description on Prior Art

Prior Art devices of this type have relied on a variety of different design configurations, all of which position a food engagement grill or mesh surface over a burner of a stove top to grill food thereon. Examples of same can be found in U.S. Pat. Nos. 4,729,297, 4,679,816 and 3,469,524.

In U.S. Pat. No. 4,729,297 a cooking grill can be seen having multiple part assembly including a support ring placed on the stove top, a base with annular vents in the side walls with a central opening therein. A grease catching pan is supported within the base and a wire grill configuration is placed thereon. A hood or lid is placed over the grill enclosing the cooking area.

U.S. Pat. No. 4,694,816 is directed to a grill apparatus having a shallow annular base pan with an opening in the center thereof. A grill element is positioned within the base on support feet with a central open portion. The grill supports the food around the central opening and has a lid engageable thereon.

U.S. Pat. No. 3,469,524 discloses a fry pan in which a contoured base is positioned directly on a flat burner and has a generally convex configuration to its upper surface. A plurality of lug like risers extend from this convex surface with drainage grooves within. An annular reservoir is formed around the contoured raised surface by the base defining an area that can be filled with water into which the grease from the cooking food is directed through the grooves.

SUMMARY OF THE INVENTION

A grill device to be positioned over a burner on a stove top defines an annular reservoir base with a center open portion therein. A grill surface encloses the base and has an angularly disposed tapered surface of multiple groove channels and associated openings to support and drain food product positioned thereon into the annular reservoir filled with water.

DESCRIPTION OF THE DRAWINGS

FIG. 1 is a perspective view of the grill device;

FIG. 2 is a top plan view of a grill portion;

FIG. 3 is a cross-sectional view of the base portion of the device;

FIG. 4 is a top plan view on lines 4—4 of FIG. 3; and

FIG. 5 is an enlarged cross-sectional view on lines 5—5 of FIG. 2.

DESCRIPTION OF PREFERRED EMBODIMENT

Referring now to FIGS. 1, 3, and 4 of the drawings, a stove top grill assembly 10 can be seen comprising an annular base portion 11 and a grill portion 12. The base portion 11 has an annular upstanding wall 13 with a compound annular flange 14 extending from its upper free end thereof. The base portion 11 defines a contoured bottom 15 having a conical center wall portion 16 extending therefrom to a height less than that of said upstanding wall 13 hereinbefore described. The center wall portion 16 defines an opening 17 within that is greater than one-half the overall diameter of said base portion 11. It will be seen that the central wall portion 16 defines an annular reservoir within the base portion 11 which will generally be referred to as 18.

The grill portion 12 can best be seen in FIGS. 1, 2, 3, and 5 of the drawings comprising a generally solid annular disk having a plurality of parallel aligned channels 19 formed therein. Each of said channels 19 has tapered oppositely disposed side walls 20 and 21 intersecting at 22 defining the base of each channel 19. A series of grill ribs 23 are formed adjacent each grill channel 19 and are characterized by an inverted elongated U-shape that forms secondary intersection points at 24 between the tapered side walls 20 and 21 as hereinbefore described.

Referring now to FIGS. 2 and 3 of the drawings, it will be seen that the channels 19 are angularly disposed from a center line C (shown in broken lines in FIG. 2) so that the entire grill portion 12 is inclined therefrom to its respective perimeter supporting edge 25 on the compound annular flange 14 of the base portion 11 to provide drainage to the outer edge of the grill portion 12. A pair of spaced longitudinally aligned slots 26 are formed within each of said channels 19 at the point of intersection 22 in oppositely disposed relation to one another in the outer edge of said grill portion 12.

The grill surface as defined by the channels 19 and grill ribs 23 is coated with a non-stick permanent compound, such as Teflon® or Silverstone® both of which are well known and understood by those skilled in the art.

It will be apparent that the conical center wall portion 16 with its opening 17 therein can be aligned directly over a stove top burner (not shown) and that the wide stance of the base portion 11 in combination with the water filled annular reservoir 18 provides a secure, stable, non-tippable base to support the grill portion 12 as hereinbefore described.

The device thus achieves an odorless and smokeless environment since there is no hot surface such as charcoal or the like onto which grease and/or food juices will fall and burn.

It will thus be seen that a new and useful stove top grill device has been illustrated and described and it will be obvious to those skilled in the art that various changes and modifications may be made therein without departing from the spirit of the invention.

Therefore I claim:

1. A stove top grill apparatus for cooking food on electric or gas stove burners comprising a base portion and a grill portion, said base portion having an annular upstanding wall and an integral apertured conical center wall in spaced relation thereto, a grill portion positioned in spaced relation on said base portion, said grill portion having a plurality of aligned parallel channels, each of said channels defining an upstanding grill rib therebetween, each of said channels are angularly disposed from its longitudinal center to its perimeter edge, slots formed in oppositely disposed relation to one another in each of said channels at their respective perimeter edge, said slots in adjacent channels defining an annular pattern of parallel slots around the perimeter edge of said grill portion, and means for stabilization of said base.

2. The stove top grill of claim 1 wherein said channels have intersecting tapered oppositely disposed side walls said slots in each of said channels intersect a portion of said side walls adjacent one another.

3. The stove top grill of claim 1 wherein said slots are spaced in relation to one another and extend longitudinally within said channels.

4. The stove top grill of claim 1 wherein said means for stabilization of said base comprises a water reservoir formed between said annularly upstanding wall and integrally apertured conical center wall.

* * * * *